(12) United States Patent
Deodhar et al.

(10) Patent No.: US 12,373,762 B2
(45) Date of Patent: Jul. 29, 2025

(54) SYSTEM AND METHOD FOR JUST IN TIME CHARACTERIZATION OF RAW MATERIALS

(71) Applicant: Tata Consultancy Services Limited, Mumbai (IN)

(72) Inventors: Anirudh Makarand Deodhar, Pune (IN); Abhishek Baikadi, Pune (IN); Sriharsha Nistala, Pune (IN); Rajan Kumar, Pune (IN); Ashit Gupta, Pune (IN); Sivakumar Subramanian, Pune (IN); Venkataramana Runkana, Pune (IN); Rohan Pandya, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 33 days.

(21) Appl. No.: 17/753,109

(22) PCT Filed: Aug. 20, 2020

(86) PCT No.: PCT/IN2020/050726
§ 371 (c)(1),
(2) Date: Feb. 18, 2022

(87) PCT Pub. No.: WO2021/033207
PCT Pub. Date: Feb. 25, 2021

(65) Prior Publication Data
US 2022/0284373 A1    Sep. 8, 2022

(30) Foreign Application Priority Data
Aug. 20, 2019 (IN) .............................. 201921033532

(51) Int. Cl.
G06Q 10/0639 (2023.01)
G06N 20/00 (2019.01)
(Continued)

(52) U.S. Cl.
CPC ....... G06Q 10/06395 (2013.01); G06N 20/00 (2019.01); G06Q 10/04 (2013.01); G06Q 10/067 (2013.01); G06Q 50/04 (2013.01)

(58) Field of Classification Search
CPC ............. G06Q 10/06395; G06Q 10/04; G06Q 10/067; G06Q 50/04; G06N 20/00
(Continued)

(56) References Cited

U.S. PATENT DOCUMENTS 7,457,763 B1    11/2008    Garrow et al.
7,660,639 B2    2/2010     Yamada et al.
(Continued)

FOREIGN PATENT DOCUMENTS

CN    110456756 A    11/2019
JP    2009228995 A    10/2009

OTHER PUBLICATIONS

Aivaliotis, et al. The Use of Digital Twin for Predictive Maintenance in Manufacturing 32 International Journal of Computer Integrated Manufacturing 11 at pp. 1067-1080 (2019), (Year: 2019).*
(Continued)

*Primary Examiner* — Charles Guiliano
(74) *Attorney, Agent, or Firm* — Finnegan, Henderson, Farabow, Garrett & Dunner, LLP

(57) ABSTRACT

In an industrial plant, various equipment are used to handle processing of raw materials. Considering complexities involved in the processes and the equipment, constant monitoring is required to obtain desired results. The disclosure herein generally relates to industrial process and equipment monitoring, and, more particularly, to data analysis for Just In Time (JIT) characterization of raw materials in any process industry. The system collects real-time plant data among other inputs, and performs characterization of raw materials being used in the plant. The characterization
(Continued)

involves categorizing the raw materials into different classes. The class information is further used to predict performance of the industrial plant, and in turn to generate recommendations for optimization of the industrial plant.

13 Claims, 12 Drawing Sheets

(51) Int. Cl.
  *G06Q 10/04* (2023.01)
  *G06Q 10/067* (2023.01)
  *G06Q 50/04* (2012.01)
(58) Field of Classification Search
  USPC ........................................................ 705/7.41
  See application file for complete search history.

(56) References Cited

U.S. PATENT DOCUMENTS

| | | |
|---|---|---|
| 7,882,438 B2 | 2/2011 | Markham et al. |
| 2006/0149407 A1 | 7/2006 | Markham et al. |
| 2013/0245807 A1* | 9/2013 | Herbst ................ G05B 13/024 |
| | | 700/117 |
| 2019/0340843 A1 | 11/2019 | McCarson et al. |
| 2020/0401113 A1* | 12/2020 | Yuan ................ G05B 19/41865 |
| 2022/0129797 A1* | 4/2022 | Daczko .................. G06N 20/00 |

OTHER PUBLICATIONS

International Search Report and Written Opinion mailed Mar. 10, 2021, in International Application No. PCT/IN2020/050726; 8 pages.

\* cited by examiner

SYSTEM AND METHOD FOR JUST IN TIME CHARACTERIZATION OF RAW MATERIALS

PRIORITY CLAIM

The present application is a U.S. National Stage Filing under 35 U.S.C. § 371 and claims priority from International Application No. PCT/IN2020/050726, filed on Aug. 20, 2020, which application claims priority from Indian Patent Provisional Application No. 201921033532, filed on Aug. 20, 2019. The entire contents of the aforementioned applications are incorporated herein by reference.

TECHNICAL FIELD

The disclosure herein generally relates to industrial process and equipment monitoring, and, more particularly, to data analysis for Just In Time (JIT) characterization of raw materials in any process industry.

BACKGROUND

In a process industry where different types of raw materials are processed to generate one or more outputs, the quality of raw materials being processed directly impacts the quality of output and the efficiency of plant. The performance of the plant may deviate in an unpredictable and non-linear manner, when two or more raw materials are mixed together. For example, performance of a coal fired thermal power plant shifts non-linearly when two diverse coals are mixed together as fuel.

Plant settings need to be adjusted according to the quality of the raw materials used, so as to obtain optimum output. However, traditionally control systems that monitor and control the industrial plants work based on design materials for deciding control parameters/logics, and the material quality and characteristics variations are not considered sufficiently. As a result, quality of the output of the plant and overall performance of the plant deviates with variation in quality of the raw materials used for processing.

Often the quality of raw material being consumed is not measured or is not available in usable form, in real-time. Sometimes, even though the quality measurements are possible, they are very expensive to conduct in real-time. In absence of real-time information of raw material quality, it is very challenging to run the plant optimally.

Moreover, plants often consist of chain of equipment (in series or parallel architecture), where the raw materials are consumed in different proportions and at different times. The supply lines of raw material for each equipment may differ resulting in non-uniform usage of raw materials across equipment and leading to operation changes in the downstream processing equipment. For example, in a thermal power plant, different pulverizers are fed through respective coal feeders, which may have varying levels and types of coal loaded, and hence may process different coals at different times. This may lead to changes in performance of a boiler, that gets fed with varying coals across its ports. Therefore, it is very important to track these raw material quality changes at individual equipment level as well.

Often the raw materials are in form of inhomogeneous mixture of solid fine materials. The transition from raw material A to raw material B may take hours to complete. The performance of the plant during this transition period of raw materials needs to be addressed in a different way, since the quality of raw material is continuously changing in this period. For example, different coals A and B are loaded in a coal bunker one after the other (say in a thermal power plant). This change of coal reflects in a pulverizer gradually, as initial high concentration of coal A diminishes with time and that of coal B gradually increases. However, this itself may occur very non-linearly over a period as high as 20 hours, as material flow is not necessarily streamlined. This directly affects the boiler performance. Therefore, there is a need to track this transition period of raw materials in real-time and accordingly provide operating recommendations for the plant.

Despite advanced predictive model-based control systems available today, identifying/building a right kind of predictive model is a challenge, given the inherent variations in the material quality and its impact on the output of the plant under different operating regimes. The existing systems do not sufficiently satisfy the need of maneuvering the plant operations by detecting, identifying, and utilizing the raw material information for optimum operation of the plant.

SUMMARY

Embodiments of the present disclosure present technological improvements as solutions to one or more of the above-mentioned technical problems recognized by the inventors in conventional systems. For example, in one embodiment, a processor implemented method for characterization of materials based on plant data is provided. In this method, initially the plant data is received from an industrial plant as input, via one or more hardware processors. Further, by processing the plant data via the one or more hardware processors, change in one or more raw materials used in the industrial plant is determined, wherein the change in the one or more raw materials is detected at least at a plant level or an equipment level. Further, at least one class that matches each of the one or more raw materials is determined, using at least one material class identification model, via the one or more hardware processors, wherein the determined at least one class is a newly defined class or is from a set of pre-defined classes. Further, material characteristics are predicted for each of the raw materials, via the one or more hardware processors. Then, at least one of a plurality of predictive models associated with at least one of the predicted material characteristics and the determined at least one class of the one or more raw materials is selected, via the one or more hardware processors, and using the selected at least one predictive model is used to predict performance of the industrial plant, via the one or more hardware processors. An actual performance of the plant also is measured, and if the actual performance is below a threshold of performance, then at least one recommendation is generated to optimize performance of the industrial plant based on the predicted performance, via the one or more hardware processors.

In another aspect, a system for data characterization of materials based on plant data is provided. The system includes one or more hardware processors, a communication interface, and a memory storing a plurality of instructions. The plurality of instructions when executed, cause the one or more hardware processors to receive the plant data from an industrial plant as input. Further, by processing the plant data via the one or more hardware processors, change in one or more raw materials used in the industrial plant is determined, wherein the change in the one or more raw materials is detected at least at a plant level or an equipment level. Further, at least one class that matches each of the one or more raw materials is determined, using at least one material class identification model, via the one or more hardware processors, wherein the determined at least one class is a newly defined class or is from a set of pre-defined classes. Further, material characteristics are predicted for each of the raw materials, via the one or more hardware processors. Then, at least one of a plurality of predictive models associated with at least one of the predicted material characteristics and the determined at least one class of the one or more raw materials is selected, via the one or more hardware processors, and using the selected at least one predictive model is used to predict performance of the industrial plant, via the one or more hardware processors. An actual performance of the plant also is measured, and if the actual performance is below a threshold of performance, then at least one recommendation is generated to optimize performance of the industrial plant based on the predicted performance, via the one or more hardware processors.

In yet another aspect, a non-transitory computer readable medium for characterization of materials based on plant data is provided. The non-transitory computer readable medium is comprised of a plurality of executable instructions stored in the memory. The plurality of instructions when executed, cause the one or more hardware processors to perform the following method for the characterization of the materials based on the plant data. In this method, initially the plant data is received from an industrial plant as input, via one or more hardware processors. Further, by processing the plant data via the one or more hardware processors, change in one or more raw materials used in the industrial plant is determined, wherein the change in the one or more raw materials is detected at least at a plant level or an equipment level. Further, at least one class that matches each of the one or more raw materials is determined, using at least one material class identification model, via the one or more hardware processors, wherein the determined at least one class is a newly defined class or is from a set of pre-defined classes. Further, material characteristics are predicted for each of the raw materials, via the one or more hardware processors. Then, at least one of a plurality of predictive models associated with at least one of the predicted material characteristics and the determined at least one class of the one or more raw materials is selected, via the one or more hardware processors, and using the selected at least one predictive model is used to predict performance of the industrial plant, via the one or more hardware processors. An actual performance of the plant also is measured, and if the actual performance is below a threshold of performance, then at least one recommendation is generated to optimize performance of the industrial plant based on the predicted performance, via the one or more hardware processors.

The system stores information on a plurality of the classes in a database, wherein each of the plurality of classes comprises material characteristics, plant data, predictive models associated with the class, a plurality of optimum settings associated with the class, clustering information, extracted classification rules, and one or more secondary information. The term 'secondary information' refers to any information apart from the aforementioned examples, which are used at any stage of the raw material characterization process being executed by the system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
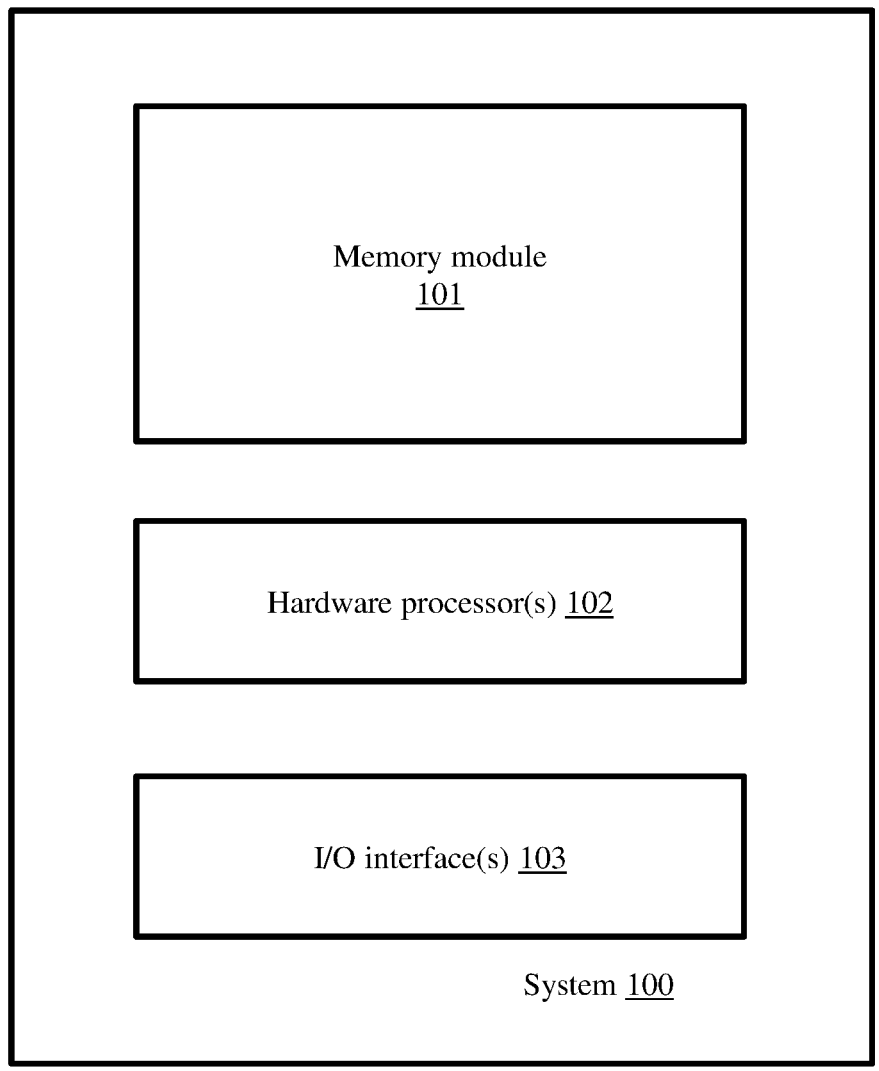
FIG. 1 illustrates an exemplary system for characterization of materials, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 7B, where similar reference characters denote corresponding features consistently throughout the figures, there are shown preferred embodiments and these embodiments are described in the context of the following exemplary system and/or method.

FIG. 1 illustrates an exemplary system for characterizing raw materials, according to some embodiments of the present disclosure. The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory module (s) 101 are further configured to store a plurality of instructions, which when executed, cause the one or more hardware processor(s) 102 to perform different actions associated with the free space identification being handled by the system 100. The memory module(s) 101 can be further configured to store any data (such as input sensor data, any intermediate output (such as the generated occupancy grid map, seed information and so on), and output (i.e. data pertaining to the free space identified), associated with the material quality detection being handled by the system 100.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like. The one or more hardware processors 102 are configured to perform data and control signal processing, at different stages of the free space detection, as required.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server. The communication interface(s) can be configured to provide one or more channels with appropriate protocols, for the system 100 to communicate with one or more external systems. For example, the communication interface(s) 103 interacts and collects inputs required for the free space detection, from one or more sensors, wherein the sensors may or may not be part of the system 100. The communication interface(s) 103 may further provide appropriate user interface(s) for an authorized user to interact with the system 100. The communication interface(s) 103 can be further configured to provide one or more channels for different components of the system 100 to interact with each other and perform data and/or control transfer.

The system 100 may be implemented in a variety of ways, even though basic functionalities remain the same i.e. the raw material characterization and in turn, generating recommendations for plant/process optimization. An example implementation of the system of FIG. 1 is depicted in FIG. 2. Various steps involved in the process of raw material characterization are depicted in flow diagrams in FIG. 3 through FIG. 5.

Figure 2A:
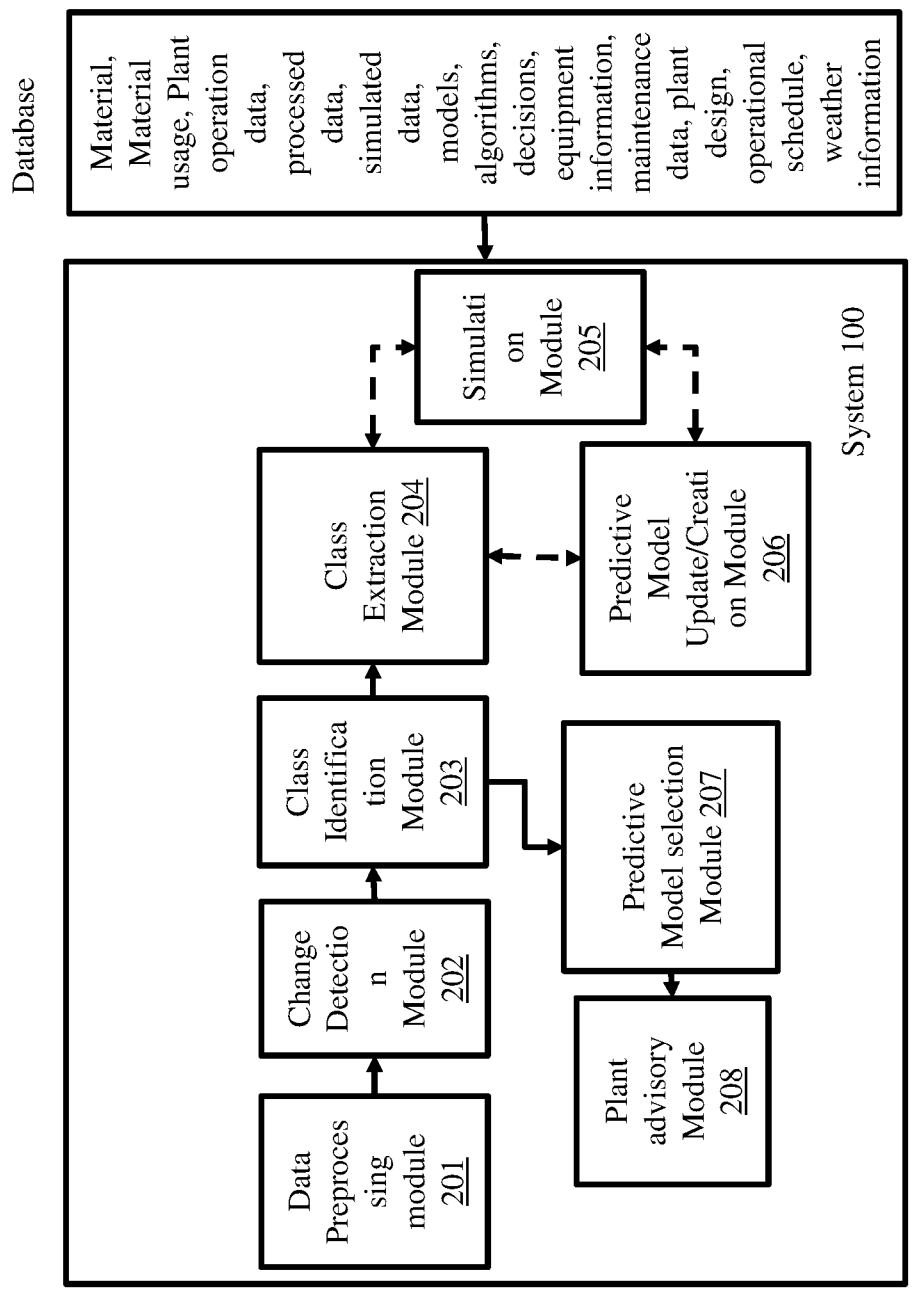
FIG. 2A is a block diagram depicting an implementation of the system of FIG. 1, according to some embodiments of the present disclosure.
Figure 2B:
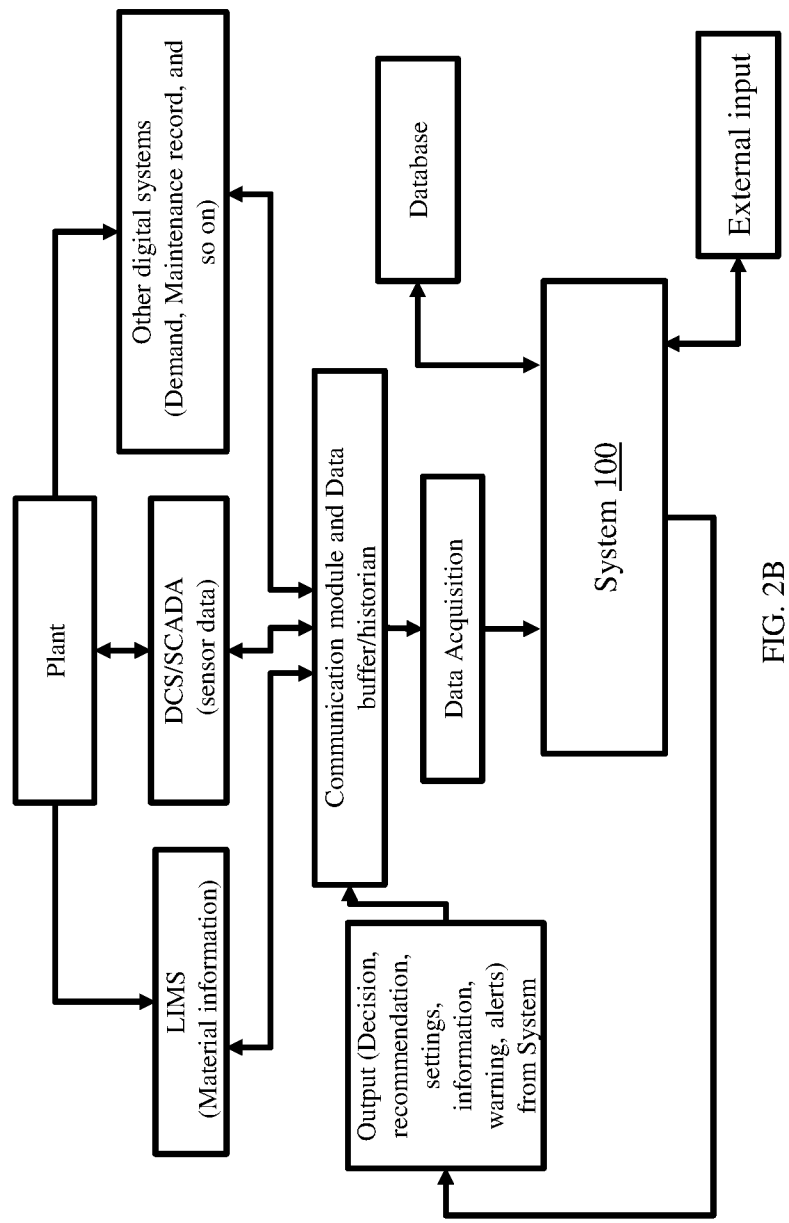
FIG. 2B is a block diagram depicting an example deployment of the system of FIG. 2A in an industrial plant setup as a digital twin, according to some embodiments of the present disclosure.
Figure 3A:
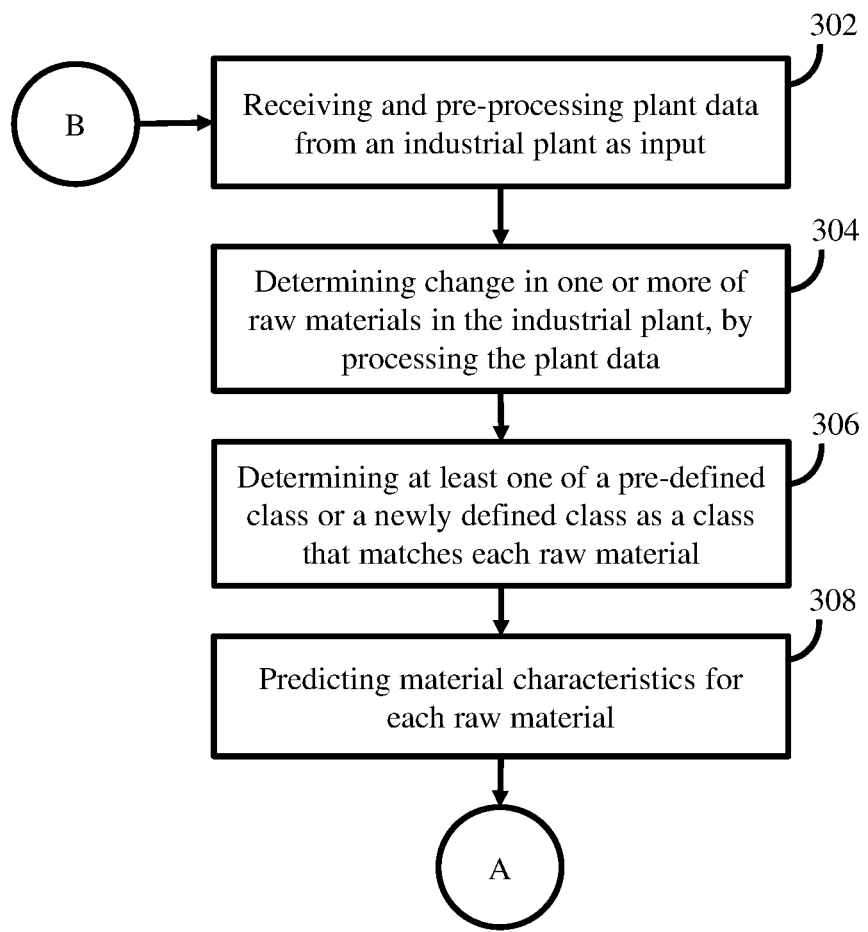
FIGS. 3A and 3B (collectively referred to as FIG. 3) is a flow diagram depicting steps involved in the process of generating recommendations based on characterization of materials, using the system of FIG. 1, in accordance with some embodiments of the present disclosure.
Figure 3B:
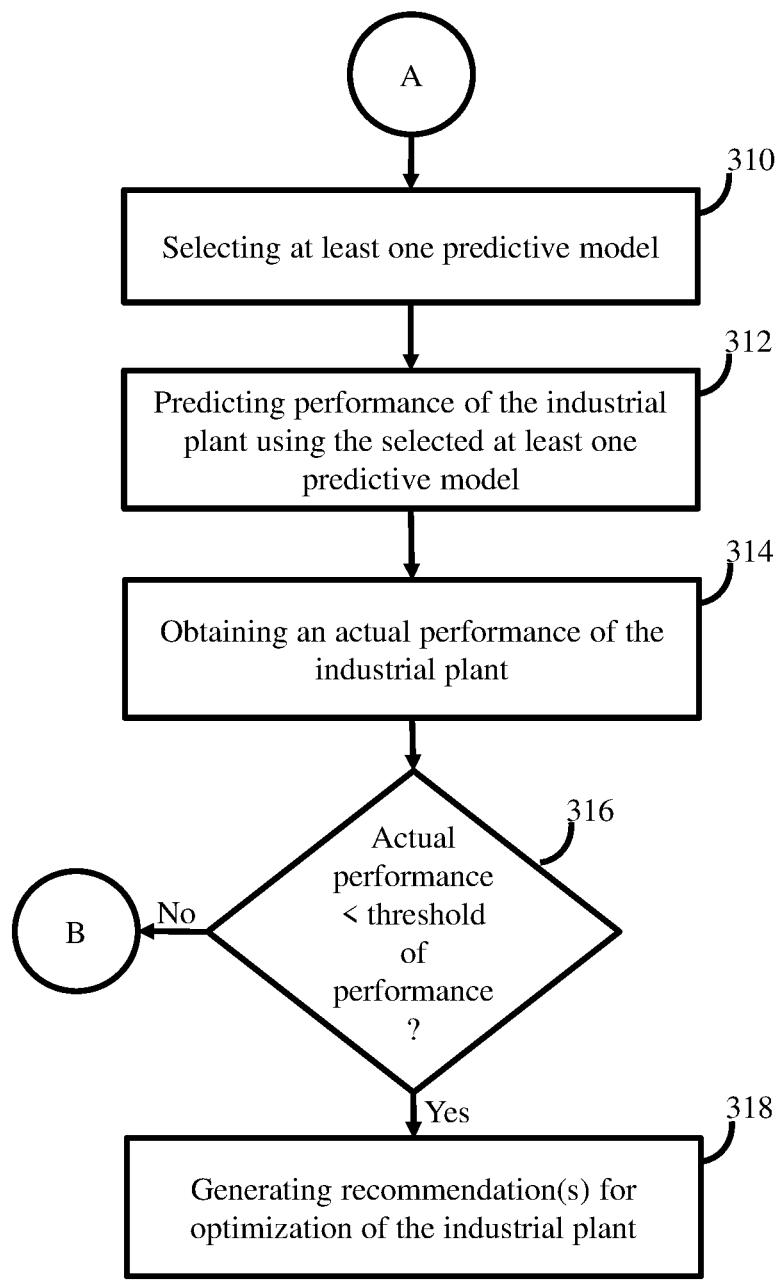

FIG. 2A is a block diagram depicting an implementation of the system of FIG. 1, according to some embodiments of the present disclosure. The system implementation as in FIG. 2A includes a data pre-processing module 201, a change detection module 202, a class identification module 203, a class extraction module 204, a simulation module 205, a predictive model update/creation module 206, a predictive model selection module 207, a plant advisory module 208, and a database storing a variety of information required for the material characterization as well as data generated during and as a result of the material characterization and recommendation generation by the system 100. In order to explain working of the system 100, a scenario in which the system 100 is deployed in an industrial plant (alternately referred to as 'plant') is considered, and the steps/different stages are explained below. Deployment of the system 100 in an industrial plant environment is depicted in FIG. 2B. In this example implementation, the system 100 may act as a digital twin of the plant. Working of the system 100 is explained below. Rest of the blocks/components (i.e. apart from the system 100) depicted in FIG. 2B may be standard components of any industrial plant, and may be subject to changes, depending on type of industrial plant in which the system 100 is deployed. Also, the process steps involved in the raw material characterization and recommendation generation are depicted in FIG. 3 and FIG. 4. Working of the system 100 and each of the components of the system 100 are now explained with reference to the steps depicted in method 300, and vice-versa.

The system 100 interacts with the plant using one or more appropriate channels provided by the I/O interface(s) 103, so as to collect/receive (302) plant data as input. The plant data collected as input may include one or more of a) data collected from the industrial plant sensors, b) laboratory data based on sampled measurements of material characteristics or material batch information, and c) soft sensors and synthetic data generated through a plurality of simulators, d) plant design and maintenance data, and e) environment data. The synthetic data is generated based on an identified operating regime of the industrial plant and a plurality of material characteristics extracted from the determined at least one class. The generated synthetic data, the laboratory data, and the real-time data collected from the industrial plant, plant maintenance data and environment data are used to train the plurality of predictive models of the industrial plant. The system 100 may also fetch information on working of the plant at past instances, which is stored as historical information/data in a database in the memory 101. This plant data comprises data obtained from plant sensors, raw material characteristics from a Laboratory information management system, environmental conditions, plant/equipment maintenance information, plant/equipment design information. In an embodiment, in addition to the plant data, the system 100 may collect one or more user inputs and/or instructions required for the material characterization, recommendation generation and/or for any other processes being handled by the system 100. The data pre-processing module 201 merges, cleans, filters, and processes the plant data in real-time, and saves to the database for further use.

The change detection module 202 receives the pre-processed plant data and processes the received plant data to identify (304) whether the raw material has changed. Here the change in raw material may be identified by the system 100 in comparison with a list of raw materials previously used, and/or based on information on an initial states of the raw materials used in the plant. The change can happen due to addition and/or removal of raw materials, or due to change of a raw material from one form to another, as a result of chemical reaction(s) in the plant.

Upon detecting that a change has happened, the class identification module 203 determines (306) one or more classes of the raw material from the existing classes available in a material database in the memory 101. As each raw material has a plurality of characteristics, each material may fall into one or more classes. The system 100 may determine the change in the raw material, based on an observed change in pattern in the plant data collected. A set of raw materials being processed by the industrial plant, processes being executed, and other factors at any given instance forms a pattern. Any change/variation from the pattern is considered by the system to determine the change in raw materials. The system 100 may also predict/quantify (308) the material characteristics. If a raw material being considered does not belong to any of a plurality of pre-defined classes, the system 100 triggers the class extraction module 204. The class extraction module 204 is configured to extract characteristics of the raw material(s) being considered, and further use the extract characteristics to either define a new class or update one or more of the existing classes (i.e. the pre-defined classes). A few example scenarios in which one or more raw materials may be identified as not belonging to any of the pre-defined classes are a) the plant using a material not seen/used before, b) due to change in behavior of the plant due to equipment change or aging c) change in operating regime of the plant. The class extraction module 204 may use different types of data such as but not limited to real-time and past operating data, material characteristics, maintenance data, design data, ambient conditions data and simulated/soft sensed data, for automatically identifying the classes of different materials used. The system 100 may use the simulation module 205 to generate synthetic operating data of the plant based on the operating regime and known properties of the raw material. The system 100 may use the generated synthetic data for the class identification and class extraction purposes, at any later instance of time. Once the amount of real operating data for a new class is accumulated in sufficient amount, the simulated data weightage could be reduced during usage. The material change detection models, the material class identification models, and the material class extraction models can re-calibrate themselves automatically.

Further, the predictive model update/creation module 206, along with the predictive model selection module 207, is used to select (310) at least one predictive model matching the class of the raw materials. Some of the inputs to the predictive model are, but not limited to raw material characteristics, plant operating set points, environmental conditions, plant design and maintenance information. The predictive models may predict plant parameters comprising parameters associated with process, efficiency, costs, energy, product quality, throughput, emissions, and safety. In addition, the predictive models may also comprise of models for detecting-diagnosing process/equipment anomalies, forecasting trends and estimating remaining useful life. During selection of the predictive models, the system determines accuracy of each of the predictive models for a given input, and if the accuracy is identified as less than a threshold of accuracy, for any of the predictive models, then the predictive model is updated with new plant data collected in database. The selected predictive model is then used to predict (312) performance of the industrial plant. The system 100 also obtains (314) information on an actual performance of the industrial plant, as input. The actual performance of the industrial plant is compared with a threshold of performance, and if the actual performance is below the threshold of performance, then the plant advisory module 208 is triggered. If the actual performance is identified as exceeding the threshold of performance, then the processes from step 302 are repeated. It is to be noted that this trigger is not required by the system 100 to initiate the industrial plant/process/equipment monitoring.

Then the plant advisory module 208 uses the at least one predictive model to generate recommendation(s) for real-time optimization of the plant performance or an anomalous event, based on the predicted performance of the industrial plant. The actionable insights/recommendations are conveyed back to the communication interface 103, which in turn provides the recommendations to the user, as output of the system 100.

Figure 6:
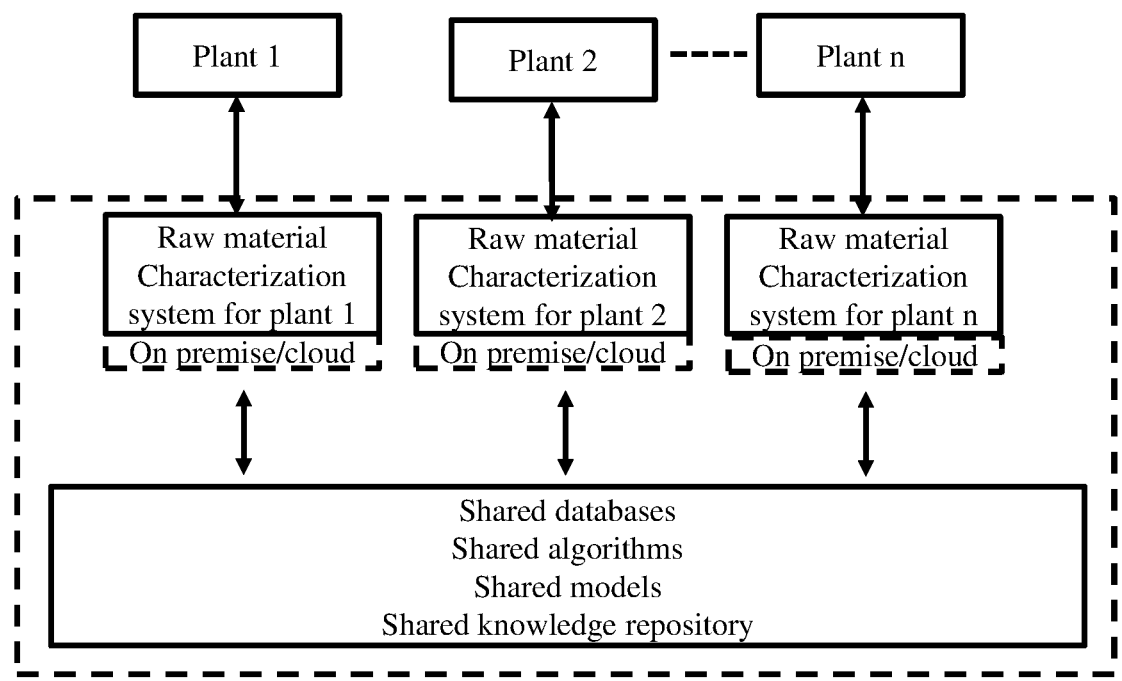
FIG. 6 depicts an example implementation of databases shared across multiple digital twin systems for multiple plants in the system of FIG. 1, according to some embodiments of the present disclosure.

Information such as but not limited to all the data that are required by the system 100 to perform the raw material classification, results of the raw material classification, and the generated recommendations are stored in the database. In addition, the databases enable recording and re-use of different types of data and information such as, but not limited to raw material properties and usage (past and planned), operating data, processed data, simulated data, models (material change detection models, material identification models, material class extraction models, plant performance prediction models that may comprise first principles models, data driven models and knowledge based models), algorithms, optimization and other decisions, expert knowledge, equipment and maintenance records, environmental conditions and plant information among others. The database may be configured to collect, store and utilize data from multiple plants at a time. This is depicted in FIG. 6. Various steps described in FIG. 2A description are depicted in FIG. 3. Steps depicted in the method 300 are performed in the same order as depicted, or in any alternate order which is technically feasible. Also, one or more steps in method 300 may be omitted.

Figure 4A:
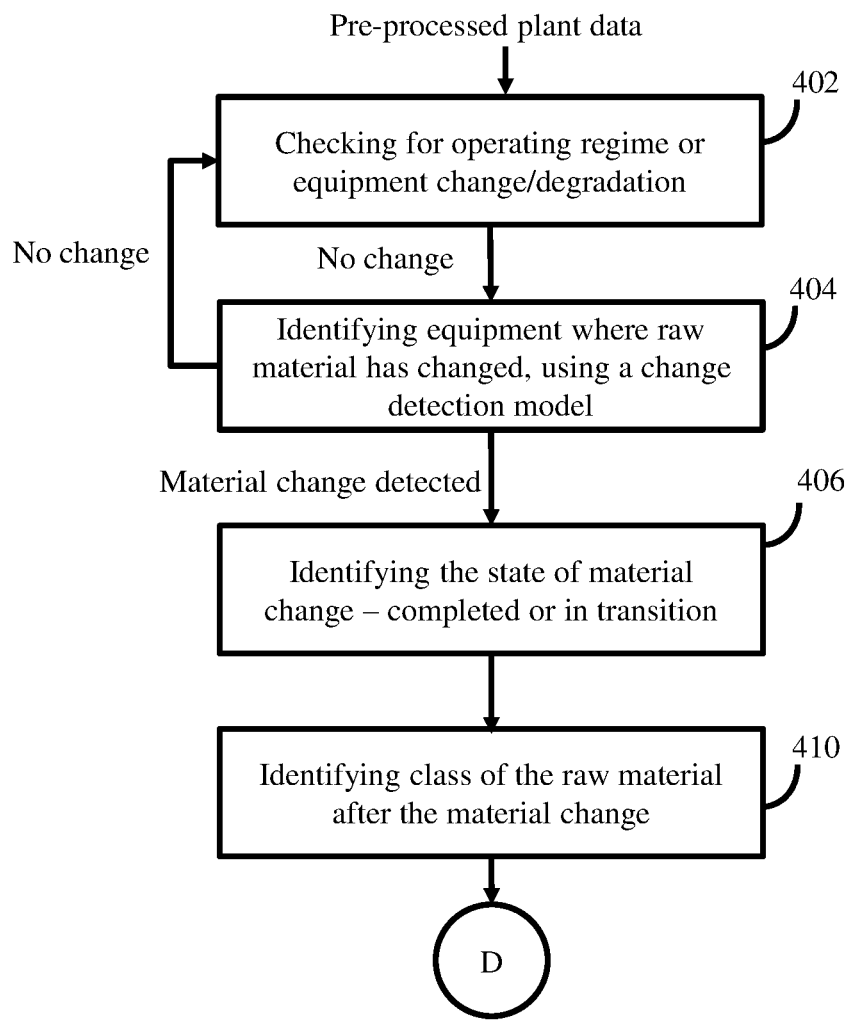
FIGS. 4A, 4B, and 4C (collectively referred to as FIG. 4) is a flow diagram depicting steps involved in the process of characterization of materials, using the system of FIG. 1, according to some embodiments of the present disclosure.
Figure 4B:
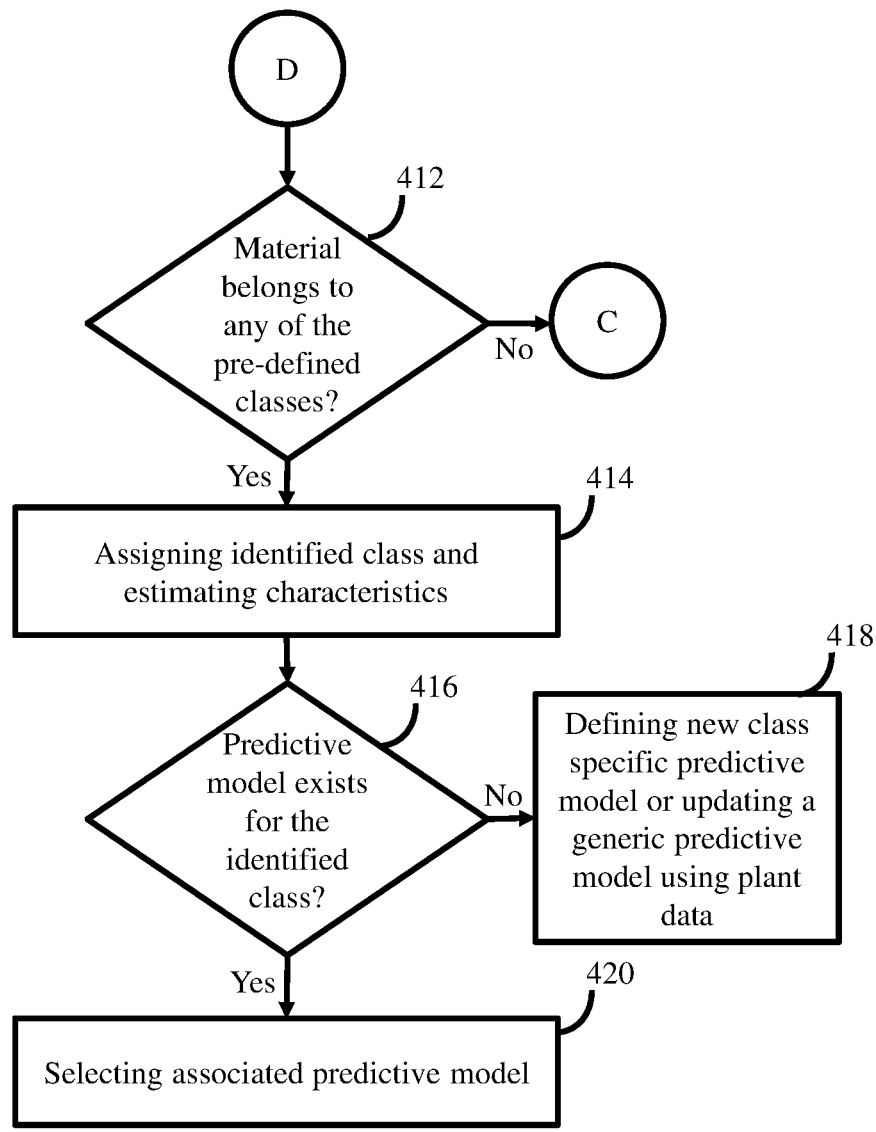
Figure 4C:
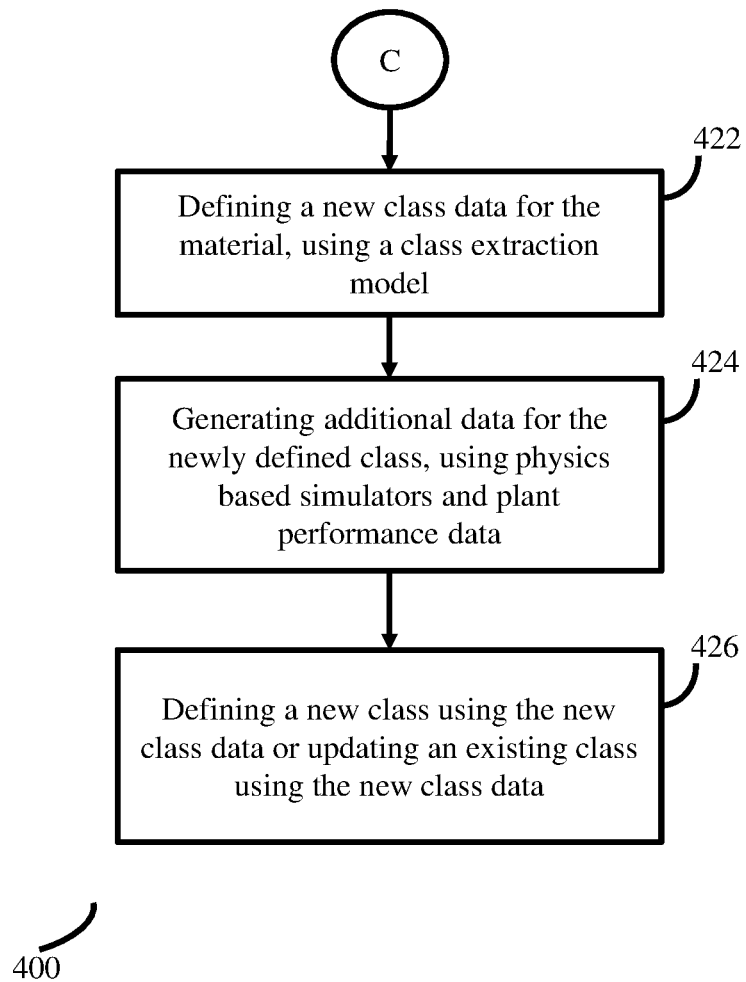

FIGS. 4A, 4B, and 4C (collectively referred to as FIG. 4) is a flow diagram depicting steps involved in the process of characterization of materials, using the system of FIG. 1, according to some embodiments of the present disclosure.

Change detection performed by the system 100 involves checking the current condition of the plant through various means such as identifying if the operating regime has changed (for example a load change or a change of active pulverizers in thermal power plants, change of product grade manufactured in a Alumina plant). This may also involve an algorithm to check if the operating parameters changed due to some anomaly or due to aging/fault in a particular equipment. If the regime or equipment have changed, the user is notified and other digital twin services are triggered, which may help mitigate the challenges arising out of such change.

However, if the no such regime/equipment change is detected, the material change detection model continuously monitors the set of key performance indicators from the plant sensors to identify if a material change has occurred. The material change detection model is run for each of the plant equipment individually or jointly and it determines if raw material changed in a particular equipment and identifies that equipment. The material change detection model may consist of data-driven models, physics based model combined with knowledge based models. An example covering working details of the material change detection model is given below.

The characteristics of a material being consumed often leave their signature in the operation of equipment/process. For example, in a coal fire boiler a coal that is harder to grind will always leave an imprint on the pulverizer in terms of power consumed or pressure parameters. Similarly, a coal with higher moisture will need more air and air at a higher temperature to allow evaporation of moisture before entering the boiler. The material change detection algorithm monitors these key material indicator parameters to check if there is any change observed in raw material. As shown in the example FIG. 7A, the change might be very slow or quick. The transition from one material to another may manifest only in terms of certain parameters and not others. For instance, there are 3 materials used in equipment A over a period of 24 hours. Material 1 and 2 have similar hardness but different chemical composition. Material 3 has much different hardness but composition very similar to material 1. The material change detection model is pre-built based on the historical data of plant performance parameters and relevant measured material characteristics in the past. Alternatively, the material change detection model may also be automatically extracted from the class extraction process. The material change detection model tracks the key material signature parameters as shown in the figure and identifies a significant change in one or more of them and then assigns the change to corresponding change in the material properties, indicating change in material class.

Figure 7A:
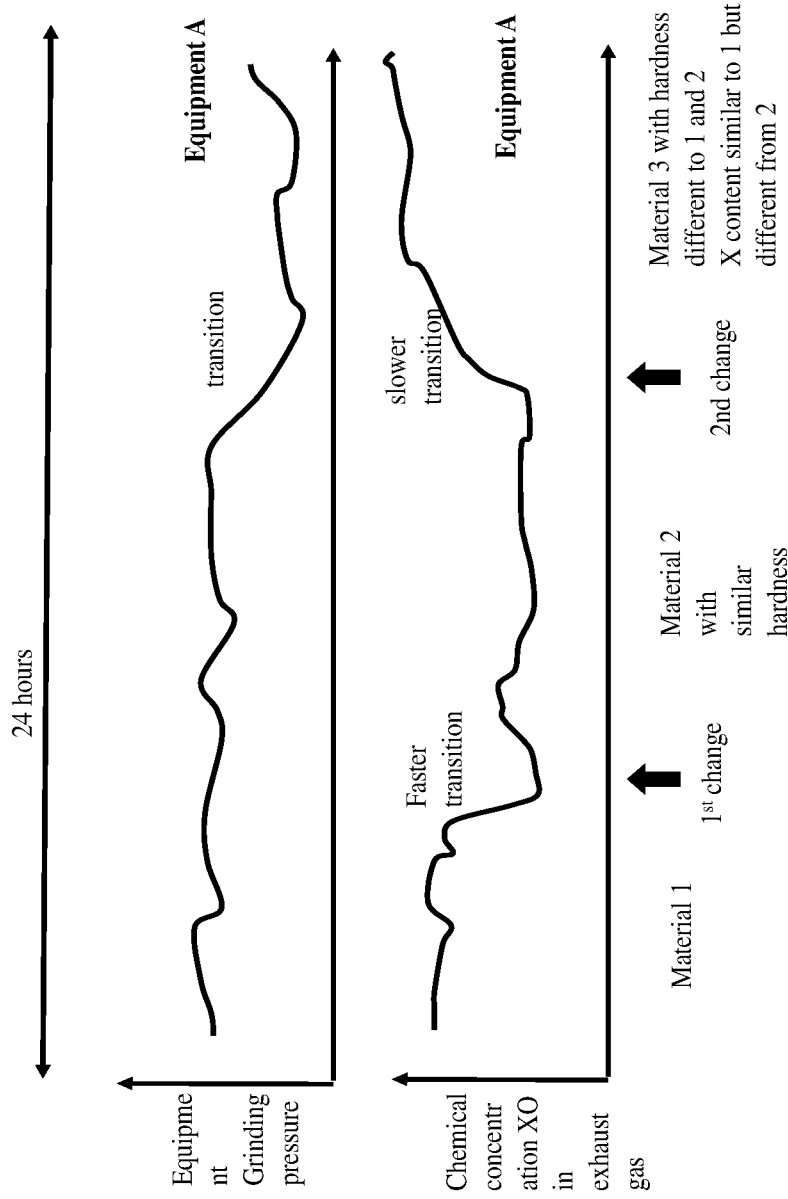
FIGS. 7A and 7B are example diagrams depicting transition of raw materials, according to some embodiments of the present disclosure.
Figure 7B:
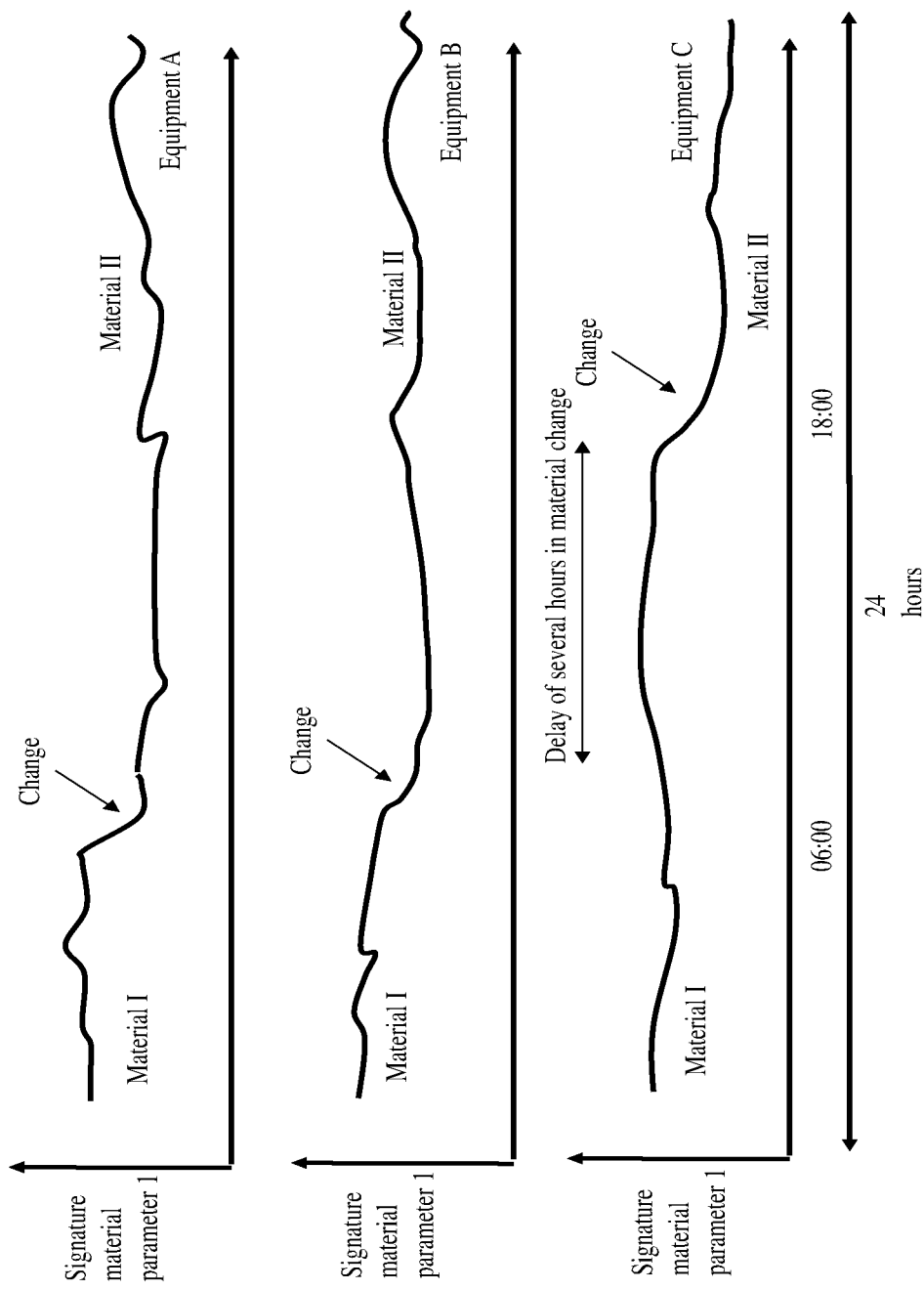

One more complex part of the process is that each equipment may experience material change at a different time. As depicted in FIG. 7B, equipment A and B see material change from I to II starting at 6:00 hours, while equipment C keeps using the previous material I till 18:00 hours. This could be because of multiple reasons including shutdown of a particular equipment for maintenance or redundancy in the system. However, material change detection models monitor each equipment individually and identifies the equipment that is experiencing change of material.

In addition, some of the changes may manifest faster and some slower. For example, the transition from material I to II is quicker and that from II to III is slower. The material change detection model identifies the transition periods of the material. This could be accomplished by combination of physics, knowledge rules and advanced data-driven time series techniques. For instance, an advanced time series clustering technique such as dynamic time warping could be applied on selected set of plant measured parameters (identified previously based on knowledge) and a set of physics based calculated parameters (not directly measured). An example of physics based calculated parameters could be heat balance calculation in a pulverizer or a boiler that serves as moisture signature of the material used. The material change detection model observes the trends/patterns in the multiple plant parameters over a previously identified period called windows and then keeps comparing these successive windows with respect to one another in real-time. When the difference between successive windows of such multiple parameters is beyond a threshold, the raw material change is detected. The threshold could be chosen based on the domain expertise or statistical parameters based on the historical data of the plant.

The detection of transition period of a material is important because it affects the performance and the optimization strategy of a plant immensely. If the material change detection model identifies that material transition is not completed, it passes this information to different set of transition models. However, if the material change detection model identifies the completion of material change and stabilization of plant, the information is passed on to a selected predictive model. Transition models may be a separate set of material identification, plant predictive models built specifically for handling transition periods between two materials, being processed.

While executing the material change detection, at step 402, the system 100 processes the pre-processed data to detect if there is any change in an operating regime or equipment change/degradation. For example, if the system 100 is used for the material characterization in a plant producing grade A of a product and now it is being used while processing grade B of a product, this may be identified by the system 100 as a change in operating regime. Similarly, if one or more of the equipment are changed or if any of the equipment is degraded beyond a set threshold of degradation, this also is considered as the 'change'. If there is no regime/equipment change, then at step 404 the system 100 identifies if a raw material has changed, and if yes, identifies equipment where the raw material has changed (referred to as material change), using a material change detection model. If the material change is detected, then at step 406 the system 100 checks a state of the material change. The state of the material change is one of 'material change completed' and 'material change in transition'. Some material changes may be time consuming. If the material change has been completed, then at step 410 the system 100 identifies class of the raw material (i.e. the raw material that exists after the change) using one or more material class identification models. The material class identification models may be pre-built based on historical data from the plant, and may be stored in the database.

The system 100 may use one or more appropriate material class identification models to identify class(es) of the raw materials.

Each material class identification model receives the real-time data of the plant and predicts the class, the material belongs to. The classes of material may be predetermined based on material class extraction model. The material class identification models could be a combination of pre-built data driven classification models, physics-based models and knowledge-based models. For example, the material class identification model may include a machine learning based advanced classification model built using historical data of the plant. However, it may utilize the physics-based models/calculations for accuracy improvement. As an example, the heat balance models are used for identifying high or low moisture materials in a thermal power plant. In addition, they may use plant specific knowledge of control loops in order to build rules which could be embedded into the heat balance models. The development of a material identification model is tightly coupled with material class extraction and material quality prediction models.

If the material class identification model classifies the existing material into predetermined set of classes, it assigns the identified class to the material and then triggers material quality prediction models to quantify the characteristics of the material. The material quality prediction model receives the real-time data (process data and measured properties) from the plant, the information associated with the identified class to estimate the characteristics of the material.

A few examples of the characteristics of a raw material, which may be predicted/measured are:

Chemical composition (concentration of specific elements such as carbon, nitrogen, volatiles in coal, in thermal power plant)

Physical composition (concentration of magnetite, hematite in an iron ore in a steel plant)

Physical properties (hardness, moisture for coal in thermal power plant, tumbler index for coke in a coke plant)

Shape/size of material (size distribution of coke pellets in coke plant, fineness of pulverized coal in a thermal power plant)

Form/state (condition of coke, iron ore while loading into blast furnace in steel plant)

Inherent chemical properties (kinetic parameters of combustion of coal, ash fusion temperature for coal)

Some of the characteristics may not be directly measurable by the system 100. In such cases, the system 100 uses certain soft sensors which in combination can give a measure of or an indication of the directly non-measurable characteristic(s). For example, moisture in a raw material manifests itself in form of heat absorption in the plant where the material combusts. The parameters representing heat transfer in the plant or other soft sensed parameters representing heat balance in a plant may be used by the classification and class extraction algorithm to separate materials with different moisture content. Similarly, ash fusion temperature of mix of coals is not measured during the operation of a boiler, in a thermal power plant. However, it is critical because if the temperature of the furnace goes beyond the fusion temperature, the fusing of ash may cause permanent damage to the boiler. The material quality prediction models may use the operation data as well as the offline coal property data such as oxide composition to predict the fusion temperature real-time, assisting the plant operation.

In addition, advanced sensors may be placed at appropriate locations within the plant and then these measurements could be used for change detection and material class identification. For example, in a coal fired thermal power plant, real-time gas analyzer for measuring composition of flue gas and an infrared temperature analyzer for furnace temperature could be installed. The measurements of different elements in flue gas such as unburnt carbon, ash composition could be used for detecting the class of coal and predicting its properties in real-time. The measurements of furnace temperature may provide insights into ash chemical properties thereby allowing better classification of coal in a power plant.

The material quality prediction models as stated above, may use a combination of data-driven models using machine learning/deep learning regression, physics-based models and the expert knowledge models.

An example of the material quality prediction model using first principles based fundamental model is explained below. Some of the characteristics of raw material such as its kinetic parameters (representative of the way these materials react in chemical reactions) are not measurable real-time. Other examples are material particle size distribution and physical composition. For example, the fineness of iron ore cannot be measured real-time or blending ratio of two iron ores coming from two different mines having completely different properties is not measured online. However, these characteristics have a significant impact on the plant performance. These characteristics are quantified using below method.

As an example, a first principles based prediction model comprise of a physics based simulation model that predicts the plant performance as a function of raw material characteristics and the operating conditions of the plant. The characteristics which are identified by the other material quality prediction model are supplied to this first principles based prediction model along with data pertaining to unknown characteristics. The first principles based prediction model reads the operating conditions in real-time and predicts the plant performance in real-time. This plant performance is compared against the measured plant performance obtained from sensors in real-time. The unknown characteristics are tuned such that predicted plant performance matches with the actual measured one with desired accuracy. This is done through an internal optimization loop. These characteristics once identified are stored in the database for future use. So, the system learns the raw material characteristics and adjusts, which is required further for plant overall optimization.

If the material identification model cannot classify the current material into existing set of classes, material class extraction models are triggered.

If at step 412 the raw material is identified as belonging to one of the pre-identified classes stored in the database, then at step 414 the system 100 quantifies the characteristics of the raw material using one or more material quality prediction models. The material quality prediction models could be a combination of data-driven models, physics based fundamental models and knowledge models. The material quality prediction models may use real-time operation data from plants as well as material characteristics information. In another embodiment, the material quality prediction models may also use stored simulated data from the database as well as the historical data of the plant from the various databases. A material could be classified into specific class or can be shared across multiple classes with appropriate similarity indices assigned for each class. Multiple materials could be classified under a same class. The material quality prediction models may comprise of either data driven models, first principles based models, knowledge based models or their combinations.

If at step 412, the raw material is identified as not belonging to any of the pre-defined classes, then at step 422 the system 100 uses the material class extraction models to either create/define a new class of materials with all its relevant information or to reclassify existing classes. Additional data required for a newly defined class is generated using physics based models and plant performance data, at step 424. Using the additional data generated, either one or more of the existing classes are updated, or a new class is defined at step 426. The Reclassification might be required for different operating regimes or aging of plant equipment.

Once the material class and characteristics are identified, further at step 416, the system 100 checks if one or more appropriate predictive models exist for the identified classes of the raw material. If matching predictive model(s) exists, the system 100, at step 420, selects the matching/associated predictive model. The predictive models capture relationship between various plant parameters with respect to certain plant output parameters of interest. For example, a predictive model may receive raw material characteristics, plant operating settings as input to predict product quality. The predictive models may comprise of either data-driven models, first principles based models, knowledge based models or their combinations. Different predictive models can be built for different raw material classes or a single (generic) model catering to all raw material classes can be built. In case of different predictive models, appropriate predictive model is selected for further use once the raw material class is identified. In case of single model, appropriate plant parameters identified from the class extraction algorithm are supplied as input to the predictive model for the predictive model to work for that particular class of raw materials. In another embodiment, the predictive models may also include predictive maintenance type models (fault detection, RUL estimation, forecasting).

If multiple suitable/appropriate predictive models are identified, then the system 100 determines accuracy of each of the predictive models, and may select the predictive model having highest accuracy from among the predictive models, and uses for plant optimization. If the predictive models are accurate enough, they are further used for plant optimization. As part of the plant optimization, the system 100 may generate alerts and providing operating recommendations to an authorized user. Once appropriate predictive models are obtained, the optimization models in the system 100 are used to identify the optimum operation settings for the plant. The optimization models use the selected predictive models along with various pre-existing optimization algorithms from the database to identify optimum settings for the plant. The optimum settings or recommendations from the system are stored in the database for future use. Alternatively, the identified classes and characteristics could be used as input to operation advisory and predictive maintenance models as well. They may assist in forecasting performance of an equipment and also detecting-diagnosing anomalous behavior of a process/equipment. If no predictive model exists for a particular type of raw material class or if the existing predictive model is not appropriate for the identified class, at step 418 the system 100 creates new class specific predictive models or one or more of the existing predictive models are updated with latest data and identified characteristics of the raw material. The updated/created predictive models are stored in the database with appropriate tagging of the raw material class as well as the relevant tagged input parameters.

If no appropriate predictive model exists and if no new class specific predictive model was generated (due to any reason, for example, due to unavailability of required data), then the system 100 may generate warnings to alert users, and details and outcome of above process are displayed to one or more users through a user interface. The user may validate one or more results/outcomes from the system through the user interface. The user inputs are stored in the database for future use. Steps depicted in the method 400 are performed in the same order as depicted, or in any alternate order which is technically feasible. Also, one or more steps in method 400 may be omitted.

Figure 5:
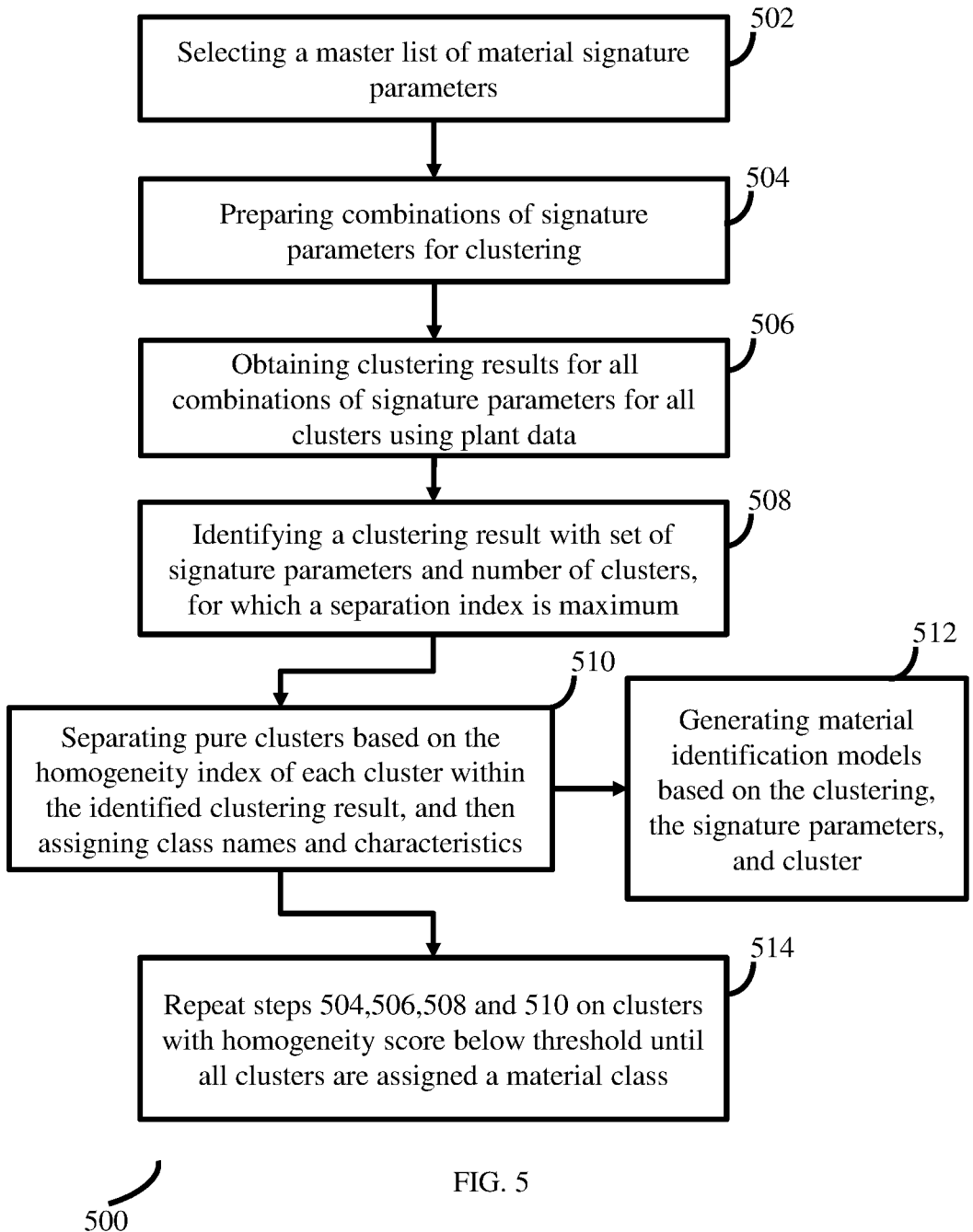
FIG. 5 is a flow diagram depicting steps involved in the process of an automatic stepwise clustering being performed by a material class extraction model, using the system of FIG. 1, in accordance with some embodiments of the present disclosure.

FIG. 5 is a flow diagram depicting steps involved in the process of an automatic stepwise clustering being performed by a material class extraction model, using the system of FIG. 1, in accordance with some embodiments of the present disclosure.

Initially, a master list of material signature parameters (selected a priori based on plant and domain knowledge) is obtained from the database at step 502. The material signature parameters are plant process variables that indicate the type of material used or its properties directly/indirectly. For example, in a coal fired thermal power plant, amount of Sulphur oxides in the exhaust gases indicate the levels of Sulphur in raw material coal, or power consumed by the coal pulverizer indicates the hardness of the coal. Alternatively, some physics calculated soft sensors such as heat balance across the pulverizer may also indicate the amount of moisture in the coal.

Further, at step 504, the system creates/prepares large number of possible permutations and combinations of the material signature parameters. This could be either exhaustive or selective. Some of the parameters may be grouped together while creating combinations. For example, in a coal fired thermal power plant the heat balance across pulverizer and pulverizer parameters such as air temperature and air flow rates could be grouped together since all of them significantly represent material moisture. All sets of parameter combinations are created and stored in the memory. The stored operation data and the property data available in the database, is divided into different operating regimes. For example, operation data with plant operating at 100% load is separated from operation data at 50% load. The data is then normalized suitably. Further, at step 506, the system 100 uses a machine learning based clustering on the set of processed plant data to obtain clustering results for all the possible permutations and combinations of the material signature parameters prepared at step 504. This data comprise of data received from sensors and stored in the database. If sufficient amount of such data is not available, material characteristics data from LIMS could also be used for clustering. The clustering is done for all sets of parameter combinations varying the hyperparameters such as number of clusters or type of clustering (density/distance based). The best set of clustering results are obtained by comparing the separation index for each of the combination clustering results. The clustering result with maximum separation index is identified as the best clustering at that stage, at step 508.

Separation index~Function (statistical clustering index such as completeness score, proportion of separation between plant data points associated with different material batches, degree of separation between plant data points associated to each of the material batches)

The separation index is a number indicating how well the plant data has separated into diverse clusters both from machine learning/statistical perspective as well as from the ground truth perspective. The ground truth here refers to the information of raw material batches or characteristics available against each operating plant data point user for clustering. First, for each of the combinations of plant data parameters, best clustering results are obtained by varying number of clusters. This is obtained based on statistical tests like Silhouette or elbow bend methods, well known in machine learning field. Then each of these clustering results are compared against each other based on how well the plant data belonging to each of the material batches separated. As an example, when more than 90% of all the plant data associated with a material batch gets accumulated in one of the clusters, they receive a high separation score. This could happen due to multiple reasons including incorrect association of plant data with a specific batch of materials or varying characteristics of materials in a batch itself. The algorithm however accommodates this by separating the data. Then the separation index of all the plant data points for the entire clustering result is calculated. It could be either an average, summation or some other function of the individual separation indices. At step 508, a clustering result with maximum separation index is selected as best, from among all the combinations.

The next step 510 involves identifying clusters with best homogeneity score/index, within the identified clustering result. Homogeneity index/score indicates the similarity of plant data points as well as the associated material characteristics within a cluster.

Homogeneity index~Function (degree of uniformity within plant data points associated with each cluster, degree of uniformity within the material characteristics associated to plant data points within each cluster).

Homogeneous clusters both in terms of plant data and material characteristics are isolated as new material classes. At step 514, the steps 504 through 510 are repeated for all clusters having the homogeneity index below a threshold of homogeneity index, until all the clusters are assigned a material class.

Further, class names are automatically assigned to the pure clusters at step 510. At step 512, the system 100 generates material identification model based on the parameters, number of clusters and clustering technique and specific clustering parameters used. The material identification model comprises of a combination of data-driven and knowledge-driven classification. The knowledge here refers to the rules extracted out of clustering and separation exercise that was conducted in previous steps. The rules encode the class extraction steps executed and corresponding criteria used for separating the classes based on separation index. The system 100 then stores the data related to the identified pure clusters, that are assigned a material class in the database. This data may include:
 i. Raw material classes formed
 ii. Specific material signature and other operating data used at each stage of class extraction
 iii. Range of multiple characteristics of raw materials in each class and the related operation data as well as simulated data associated with each of the classes
 iv. Relationship between the characteristics and the plant operation data for each class (for each specific operating regime and plant configuration)
 v. Numerical and statistical information regarding the operation data for each sub-class and class of raw materials. This may comprise of measures of central tendency such as median or the basic statistics such as mean/standard deviation of each group of materials.
 vi. Material identification model generated The system 100 checks if all the clusters are assigned as material classes. If yes, the class extraction is complete. If no, extract the un-classified clusters and repeat the clustering process again on the unclassified plant data point, until no further classification can be done, as step 514.

In absence of sufficient plant operation data, either the raw material properties or the simulated data based on the predictive models (run in offline mode) could be used. For example, synthetic data may be generated using predictive models by supplying previously sampled and measured characteristics of a raw material. Alternatively, models from a different but similar design plant can be used with appropriate modification for the design and specific tuning parameters.

In few cases, a material might share multiple classes with certain similarity indices for each class. For materials which may not belong to specific class but are close relative, a distance/density based proximity index could be provided to identify the material. A new class could be created if there is sufficiently large difference between existing classes and the new characteristics. Steps depicted in the method 500 are performed in the same order as depicted, or in any alternate order which is technically feasible. Also, one or more steps in method 500 may be omitted.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of characterization of raw materials using plant data. The embodiment, thus provides a mechanism for characterization of raw materials using plant data. Moreover, the embodiments herein further provides a mechanism to generate optimization recommendations based on information regarding material characterization performed.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for characterization of materials based on plant data, comprising:

receiving the plant data from an industrial plant as input, via one or more hardware processors;

determining, by processing the plant data via the one or more hardware processors, change in one or more raw materials used in the industrial plant, wherein the change in the one or more raw materials is detected at least at a plant level or an equipment level, wherein detecting for a change in an operating regime or an equipment change or degradation and when the operating regime or the equipment is changed then a user is notified and digital twin services are triggered, wherein when the operating regime or the equipment is not changed, then the one or more hardware processors identifies the one or more raw materials is changed and identifies the equipment where the one or more raw materials is changed, wherein the change in the operating regime includes a load change or a change of active pulverizers in thermal power plants, change of product grade manufactured in the industrial plant, and wherein determining the change in the one or more raw materials comprises:

pre-processing the plant data by cleaning and merging the plant data and saving the cleaned and merged plant data to a database, wherein the plant data comprises at least one of a) data collected from industrial plant sensors, and b) soft sensors and synthetic data generated through a plurality of computer simulations, wherein the plant data is used to train a plurality of predictive models of the industrial plant and the generated synthetic data is used for class identification and class extraction purposes;

filtering preprocessed plant data; and determining the change in one or more of the raw materials based on a change in an observed pattern of the filtered plant data for at least one equipment over one or more successive time periods in real-time, wherein the change in the one or more raw materials is determined in comparison with a list of raw materials used, information on initial states of the raw materials, addition or removal of raw materials, and due to change of a raw material from a first form to a second form based on a result of one or more chemical reactions in the industrial plant and wherein the change in the one or more raw materials is determined when difference between the filtered plant data of the successive time periods is beyond a threshold;

determining at least one class that matches each of the one or more raw materials, using at least one material class identification model, via the one or more hardware processors, wherein the determined at least one class is a newly defined class or is from a set of pre-defined classes, wherein the classes of the one or more raw materials are automatically identified based on one or more types of data and wherein the one or more types of data comprises of real-time operating data, past operating data, material characteristics, maintenance data, design data, ambient conditions data and soft sensed data;

predicting material characteristics for each of the one or more raw materials, via the one or more hardware processors, wherein the material characteristics of a raw material comprise one or more directly measurable characteristics and one or more directly non-measurable characteristics, wherein the one or more directly measurable characteristic s comprise chemical composition, physical composition, physical properties, shape or size of the raw material, form or state of the raw material, and inherent chemical properties and wherein the one or more directly non-measurable characteristics comprising kinetic parameters pertaining to material chemical and physical transformations predicted using one or more sensors in the industrial plant;

quantifying the predicted one or more directly non-measurable characteristics for each of the one or more raw materials, via the one or more hardware processors, by reading operating conditions in real-time and predicting the industrial plant performance in real-time, wherein an industrial plant performance is compared against measured industrial plant performance obtained from sensors in real-time and unknown material characteristics are tuned for matching the predicted industrial plant performance with the measured industrial plant performance with desired accuracy, through an internal optimization loop, wherein the predicted one or more directly non-measurable characteristics once identified are stored in the database, results in learning the material characteristics and adjusting the unknown material characteristics;

creating one or more permutations and combinations of material signature parameters, wherein the material signature parameters are stored in a memory and are divided into one or more operating regimes;

using a machine learning based clustering on the plant data to obtain clustering results for the one or more permutations and combinations of material signature parameters, wherein the machine learning based clustering is performed for all sets of parameters combinations varying hyperparameters and a best set of clustering results are obtained by comparing a separation index for each of the clustering results, the separation index being a number indicating how the plant data has separated into one or more diverse clusters from a machine learning perspective and a ground truth perspective;

identifying the clusters with a best homogeneity score or index within the obtained clustering results, wherein the identified clusters are homogenous clusters both in terms of the plant data points and the material characteristics are isolated as new material classes, and wherein the steps of creating the one or more permutations and combinations of the material signature parameters, using the machine learning based clustering on the plant data to obtain the clustering results, obtaining the best set of clustering results by comparing the separation index and identifying the clusters with the best homogeneity score or index are repeated for all clusters having the homogeneity score or index below a threshold of homogeneity score or index, until all the clusters are assigned a material class;

selecting at least one of a plurality of predictive models associated with at least one of the predicted material characteristics and the determined at least one class of the one or more raw materials, via the one or more hardware processors, wherein the database enables recording and re-use of different types of data and information comprising raw material properties and usage, operating data, processed data, simulated data, models, algorithms, optimization and other decisions, expert knowledge, equipment and maintenance records, environmental conditions and plant information, and
wherein the database is configured to collect, store and utilize data from multiple plants at a time;
detecting transition period of the one or more raw materials in real-time, via the one or more hardware processors,
wherein when a material change detection model identifies the raw material transition is not completed, then the material change detection model passes this information to a different set of transition models, and when the material change detection model identifies a completion of the raw material change and stabilization of the plant, then information is passed on to the selected at least one of the plurality of predictive models,
wherein the transition models are a separate set of material identification, plant predictive models built for handling transition periods between two raw materials, being processed;
predicting performance of the industrial plant, using the selected at least one of the plurality of predictive models, via the one or more hardware processors;
generating at least one recommendation or an alert to optimize performance of the industrial plant based on the predicted performance, if an obtained actual performance of the industrial plant is below a threshold of performance, via the one or more hardware processors;
transmitting the at least one recommendation or the alert in real-time as an output to the user via a communication interface, to optimize the performance of the industrial plant;
optimizing performance or addressing an anomalous event or fault of the industrial plant based on the alert or the at least one recommendation in real-time;
identifying optimum operation settings for the plant using the selected at least one of the plurality of predictive models, via the one or more hardware processors; and
creating, via the one or more hardware processors, new class specific predictive models with the identified optimum operation settings when no predictive model exists for a type of raw material class or if the existing predictive model is not appropriate for the identified class, wherein plant specific knowledge of control loops is used to build rules to embed into one or more heat balance models and if no appropriate predictive model exists and if no new class specific model is generated then generating one or more warnings to alert users and outcomes are displayed to one or more users through a user interface.

2. The method as claimed in claim 1, wherein determining the at least one class matching the one or more raw materials comprises:
identifying one of a plurality of pre-existing classes as a matching class, if the plant data of the one or more raw materials are matching plant data associated with the class; and
defining a new class if no match is found for the plurality of plant data of the one or more raw materials in any of the pre-existing classes, and determining the new class as the class matching the plurality of plant data associated with the one or more raw materials.

3. The method as claimed in claim 2, wherein determining the newly defined class as the at least one class matching the one or more raw materials comprises:

determining that plant data associated with one or more raw materials do not match with plant data associated with any of the pre-defined classes;
extracting characteristics of the one or more raw materials, from the plant data; and
defining the new class using the extracted characteristics and associated plant data of the one or more raw materials.

4. The method as claimed in claim 1, wherein determining the at least one class comprises:
determining class of each of the one or more raw materials used in the industrial plant at a time of monitoring the industrial plant; and
updating class information if the one or more raw materials has transitioned from the first form to the second form, wherein the transition from the first form to the second form is determined by monitoring the one or more raw materials over a period of time.

5. The method as claimed in claim 1, wherein information on a plurality of the classes is stored in the database, wherein each of the plurality of classes comprises material characteristics, plant data, predictive models associated with the class, a plurality of optimum settings associated with the class, clustering information, extracted classification rules and one or more secondary information.

6. A system for data characterization of materials based on plant data, comprising:
one or more hardware processors;
a communication interface; and
a memory storing a plurality of instructions, wherein the plurality of instructions when executed, cause the one or more hardware processors to:
receive the plant data from an industrial plant as input;
determine, by processing the plant data, change in one or more raw materials used in the industrial plant, wherein the change in the one or more raw materials is detected at least at a plant level or an equipment level, wherein detecting for a change in an operating regime or an equipment change or degradation and when the operating regime or the equipment is changed then a user is notified and digital twin services are triggered,
wherein when the operating regime or the equipment is not changed, then the one or more hardware processors identifies the one or more raw materials is changed and identifies the equipment where the one or more raw materials is changed,
wherein the change in the operating regime includes a load change or a change of active pulverizers in thermal power plants, change of product grade manufactured in the industrial plant, and wherein determining the change in the one or more raw materials comprises:
pre-processing the plant data by cleaning and merging the plant data and saving the cleaned and merged plant data to a database, wherein the plant data comprises at least one of a) data collected from industrial plant sensors, and b) soft sensors and synthetic data generated through a plurality of computer simulations, wherein the plant data is used to train a plurality of predictive models of the industrial plant and the generated synthetic data is used for class identification and class extraction purposes;
filtering preprocessed plant data; and
determining the change in one or more of the raw materials based on a change in an observed pattern of the filtered plant data for at least one equipment over one or more successive time periods in real-time, wherein the change in the one or more raw materials is determined in comparison with a list of raw materials used, information on initial states of the raw materials, addition or removal of raw materials, and due to change of a raw material from a first form to a second form based on a result of one or more chemical reactions in the industrial plant and wherein the change in the one or more raw material is determined when difference between the filtered plant data of the successive time periods is beyond a threshold;

determine at least one class that matches each of the one or more raw materials, using at least one material class identification model, wherein the determined at least one class is a newly defined class or is from a set of pre-defined classes, wherein the classes of the one or more raw materials are automatically identified based on one or more types of data and wherein the one or more types of data comprises of real-time operating data, past operating data, material characteristics, maintenance data, design data, ambient conditions data and soft sensed data;

predict material characteristics for each of the one or more raw materials, wherein the material characteristics of a raw material comprise one or more directly measurable characteristics and one or more directly non-measurable characteristics, wherein the one or more directly measurable characteristics comprise chemical composition, physical composition, physical properties, shape or size of the raw material, form or state of the raw material, and inherent chemical properties and wherein the one or more directly non-measurable characteristics comprising kinetic parameters pertaining to material chemical and physical transformations predicted using one or more sensors in the industrial plant;

quantify the predicted one or more directly non-measurable characteristics for each of the one or more raw materials, via the one or more hardware processors, by reading operating conditions in real-time and predicting the industrial plant performance in real-time, wherein industrial plant performance is compared against measured industrial plant performance obtained from sensors in real-time and unknown material characteristics are tuned for matching the predicted industrial plant performance with the measured industrial plant performance with desired accuracy, through an internal optimization loop,
wherein the predicted one or more directly non-measurable characteristics once identified are stored in the database, results in learning the material characteristics and adjusting the unknown material characteristics;

create one or more permutations and combinations of material signature parameters, wherein the material signature parameters are stored in a memory and are divided into one or more operating regimes;

use a machine learning based clustering on the plant data to obtain clustering results for the one or more permutations and combinations of material signature parameters, wherein the machine learning based clustering is performed for all sets of parameters combinations varying hyperparameters and a best set of clustering results are obtained by comparing a separation index for each of the clustering results, the separation index being a number indicating how the plant data has separated into one or more diverse clusters from a machine learning perspective and a ground truth perspective;

identify the clusters with a best homogeneity score or index within the obtained clustering results, wherein the identified clusters are homogenous clusters both in terms of the plant data points and the material characteristics are isolated as new material classes, and
wherein the steps of creating the one or more permutations and combinations of the material signature parameters, using the machine learning based clustering on the plant data to obtain the clustering results, obtaining the best set of clustering results by comparing the separation index and identifying the clusters with the best homogeneity score or index are repeated for all clusters having the homogeneity score or index below a threshold of homogeneity score or index, until all the clusters are assigned a material class;

select at least one of a plurality of predictive models associated with at least one of the predicted material characteristics and the determined at least one class of the one or more raw materials,
wherein the database enables recording and re-use of different types of data and information comprising raw material properties and usage, operating data, processed data, simulated data, models, algorithms, optimization and other decisions, expert knowledge, equipment and maintenance records, environmental conditions and plant information, and
wherein the database is configured to collect, store and utilize data from multiple plants at a time;

detect transition period of the one or more raw materials in real-time, via the one or more hardware processors,
wherein when a material change detection model identifies the raw material transition is not completed, then the material change detection model passes this information to a different set of transition models, and when the material change detection model identifies a completion of the raw material change and stabilization of the plant, then information is passed on to the selected at least one of the plurality of predictive models,
wherein the transition models are a separate set of material identification, plant predictive models built for handling transition periods between two raw materials, being processed;

predict performance of the industrial plant, using the selected at least one of the plurality of predictive models;

generate at least one recommendation or an alert to optimize performance of the industrial plant based on the predicted performance, if a measured actual performance of the industrial plant is below a threshold of performance;

transmit the at least one recommendation or the alert in real-time as an output to the user via a communication interface, to optimize the performance of the industrial plant;

optimize performance or addressing an anomalous event or fault of the industrial plant based on the alert or the at least one recommendation in real-time;

identify optimum operation settings for the plant using the selected at least one of the plurality of predictive models; and create new class specific predictive models with the identified optimum operation settings when no predictive model exists for a type of raw material class or if the existing predictive model is not appropriate for the identified class, wherein plant specific knowledge of control loops is used to build rules to embed into one or more heat balance models and if no appropriate predictive model exists and if no new class specific model is generated then generating one or more warnings to alert users and outcomes are displayed to one or more users through a user interface.

7. The system as claimed in claim 6, wherein the system determines the one or more raw materials by:

identifying one of a plurality of pre-existing classes as a matching class, if the plant data of the one or more raw materials are matching plant data associated with the class; and defining a new class if no match is found for the plurality of plant data of the one or more raw materials in any of the pre-existing classes, and determining the new class as the class matching the plurality of plant data associated with the one or more raw materials.

8. The system as claimed in claim 7, wherein the system determines the newly defined class as the at least one class matching the one or more raw materials by:

determining that plant data associated with one or more raw materials do not match with plant data associated with any of the pre-defined classes;

extracting characteristics of the one or more raw materials, from the plant data; and defining the new class using the extracted characteristics and associated plant data of the one or more raw materials.

9. The system as claimed in claim 6, wherein the system determines the at least one class by:

determining class of each of the one or more raw materials used in the industrial plant at a time of monitoring the industrial plant; and updating class information if the one or more raw materials has transitioned from the first form to the second form, wherein the transition from the first form to the second form is determined by monitoring the one or more raw materials over a period of time.

10. The system as claimed in claim 6, wherein the system stores information on a plurality of the classes in a database, wherein each of the plurality of classes comprises material characteristics, plant data, predictive models associated with the class, a plurality of optimum settings associated with the class, clustering information, extracted classification rules, and one or more secondary information.

11. A non-transitory computer readable medium for characterization of materials based on plant data, the non-transitory computer readable medium performs the characterization of the materials by:

receiving the plant data from an industrial plant as input, via one or more hardware processors;

determining, by processing the plant data via the one or more hardware processors, change in one or more raw materials used in the industrial plant, wherein the change in the one or more raw materials is detected at least at a plant level or an equipment level, wherein detecting for a change in an operating regime or an equipment change or degradation and when the operating regime or the equipment is changed then a user is notified and digital twin services are triggered, wherein when the operating regime or the equipment is not changed, then the one or more hardware processors identifies the one or more raw materials is changed and identifies the equipment where the one or more raw materials is changed, wherein the change in the operating regime includes a load change or a change of active pulverizers in thermal power plants, change of product grade manufactured in the industrial plant, and wherein determining the change in the one or more raw materials comprises:

pre-processing the plant data by cleaning and merging the plant data and saving the cleaned and merged plant data to a database, wherein the plant data comprises at least one of a) data collected from industrial plant sensors, and b) soft sensors and synthetic data generated through a plurality of computer simulations, wherein the plant data is used to train a plurality of predictive models of the industrial plant and the generated synthetic data is used for class identification and class extraction purposes;

filtering preprocessed plant data; and determining the change in one or more of the raw materials based on a change in an observed pattern of the filtered plant data for at least one equipment over one or more successive time periods in real-time, wherein the change in the one or more raw materials is determined in comparison with a list of raw materials used, information on initial states of the raw materials, addition or removal of one or more raw materials, and due to change of a raw material from a first form to a second form based on a result of one or more chemical reactions in the industrial plant and wherein the change in the one or more raw materials is determined when difference between the filtered plant data of the successive time periods is beyond a threshold;

determining at least one class that matches each of the one or more raw materials, using at least one material class identification model, via the one or more hardware processors, wherein the determined at least one class is a newly defined class or is from a set of pre-defined classes, wherein the classes of the one or more raw materials are automatically identified based on one or more types of data and wherein the one or more types of data comprises of real-time operating data, past operating data, material characteristics, maintenance data, design data, ambient conditions data and soft sensed data;

predicting material characteristics for each of the one or more raw materials, via the one or more hardware processors, wherein the material characteristics of a raw material comprise one or more directly measurable characteristics and one or more directly non-measurable characteristics, wherein the one or more directly measurable characteristics comprise chemical composition, physical composition, physical properties, shape or size of the raw material, form or state of the raw material, and inherent chemical properties and wherein the one or more directly non-measurable characteristics comprising kinetic parameters pertaining to material chemical and physical transformations predicted using one or more sensors in the industrial plant;

quantifying the predicted one or more directly non-measurable characteristics for each of the one or more raw materials, via the one or more hardware processors, by reading operating conditions in real-time and predicting the industrial plant performance in real-time, wherein industrial plant performance is compared against measured industrial plant performance obtained from sensors in real-time and unknown material characteristics are tuned for matching the predicted industrial plant performance with the measured industrial plant performance with desired accuracy, through an internal optimization loop,
   wherein the predicted one or more directly non-measurable characteristics once identified are stored in the database, results in learning the material characteristics and adjusting the unknown material characteristics;
creating one or more permutations and combinations of material signature parameters, wherein the material signature parameters are stored in a memory and are divided into one or more operating regimes;
using a machine learning based clustering on the plant data to obtain clustering results for the one or more permutations and combinations of material signature parameters, wherein the machine learning based clustering is performed for all sets of parameters combinations varying hyperparameters and a best set of clustering results are obtained by comparing a separation index for each of the clustering results, the separation index being a number indicating how the plant data has separated into one or more diverse clusters from a machine learning perspective and a ground truth perspective;
identifying the clusters with a best homogeneity score or index within the obtained clustering results, wherein the identified clusters are homogenous clusters both in terms of the plant data points and the material characteristics are isolated as new material classes, and
   wherein the steps of creating the one or more permutations and combinations of the material signature parameters, using the machine learning based clustering on the plant data to obtain the clustering results, obtaining the best set of clustering results by comparing the separation index and identifying the clusters with the best homogeneity score or index are repeated for all clusters having the homogeneity score or index below a threshold of homogeneity score or index, until all the clusters are assigned a material class;
selecting at least one of a plurality of predictive models associated with at least one of the predicted material characteristics and the determined at least one class of the one or more raw materials, via the one or more hardware processors,
   wherein the database enables recording and re-use of different types of data and information comprising raw material properties and usage, operating data, processed data, simulated data, models, algorithms, optimization and other decisions, expert knowledge, equipment and maintenance records, environmental conditions and plant information, and
   wherein the database is configured to collect, store and utilize data from multiple plants at a time;
detecting transition period of the one or more raw materials in real-time, via the one or more hardware processors,
   wherein when a material change detection model identifies the raw material transition is not completed, then the material change detection model passes this information to a different set of transition models, and when the material change detection model identifies a completion of the raw material change and stabilization of the plant, then information is passed on to the selected at least one of the plurality of predictive models,
   wherein the transition models are a separate set of material identification, plant predictive models built for handling transition periods between two raw materials, being processed;
predicting performance of the industrial plant, using the selected at least one of the plurality of predictive models, via the one or more hardware processors;
generating at least one recommendation or an alert to optimize performance of the industrial plant based on the predicted performance, if an obtained actual performance of the industrial plant is below a threshold of performance, via the one or more hardware processors;
transmitting the at least one recommendation or the alert in real-time as an output to the user via a communication interface, to optimize the performance of the industrial plant;
optimizing performance or addressing an anomalous event or fault of the industrial plant based on the alert or the at least one recommendation in real-time;
identifying optimum operation settings for the plant using the selected at least one of the plurality of predictive models, via the one or more hardware processors; and
creating, via the one or more hardware processors, new class specific predictive models with the identified optimum operation settings when no predictive model exists for a type of raw material class or if the existing predictive model is not appropriate for the identified class, wherein plant specific knowledge of control loops is used to build rules to embed into one or more heat balance models and if no appropriate predictive model exists and if no new class specific model is generated then generating one or more warnings to alert users and outcomes are displayed to one or more users through a user interface.

12. The non-transitory computer readable medium as claimed in claim 11, wherein determining the at least one class matching the one or more raw materials comprises:
   identifying one of a plurality of pre-existing classes as a matching class, if the plant data of the one or more raw materials are matching plant data associated with the class; and
   defining a new class by extracting characteristics of the one or more raw materials, if no match is found for the plurality of plant data of the one or more raw materials in any of the pre-existing classes, and determining the new class as the class matching the plurality of plant data associated with the one or more raw materials.

13. The non-transitory computer readable medium as claimed in claim 11, wherein information on a plurality of the classes is stored in a database, wherein each of the plurality of classes comprises material characteristics, plant data, predictive models associated with the class, a plurality of optimum settings associated with the class, clustering information, extracted classification rules and one or more secondary information.

* * * * *